United States Patent [19]

Ito

[11] Patent Number: 5,553,948
[45] Date of Patent: Sep. 10, 1996

[54] STATIC PRESSURE GAS BEARING SPINDLE ASSEMBLY

[75] Inventor: Norio Ito, Kuwana, Japan

[73] Assignee: NTN Corporation, Osaka, Japan

[21] Appl. No.: 382,409

[22] Filed: Feb. 1, 1995

[30] Foreign Application Priority Data

Feb. 3, 1994 [JP] Japan ................................. 6-011500

[51] Int. Cl.⁶ .................................................. F16C 32/06
[52] U.S. Cl. ........................................ 384/107; 384/100
[58] Field of Search .................................. 384/100, 107, 384/111, 112, 113, 114, 115

[56] References Cited

U.S. PATENT DOCUMENTS

| | | | |
|---|---|---|---|
| 4,474,483 | 10/1984 | Suzuki et al. | 384/100 X |
| 4,822,182 | 4/1989 | Matsushita | 384/107 |
| 5,239,892 | 8/1993 | Sakai | 384/100 X |

FOREIGN PATENT DOCUMENTS 2235259  2/1991  United Kingdom ............... 384/100

*Primary Examiner*—Thomas R. Hannon
*Attorney, Agent, or Firm*—Nikaido Marmelstein Murray & Oram LLP

[57] ABSTRACT

A static pressure gas bearing spindle assembly which can prevent any dust contained in the compressed air used to support the spindle from sticking to the workpiece placed on the work-support table. The housing has a sleeve mounting hole in which are mounted a chucking sleeve and a bearing sleeve. A gas exhaust space is defined between these sleeves. This space communicates with the outer environment through a gas exhaust passage formed in the housing. The spindle carries at its top end a work-supporting table. The chucking sleeve is formed with a suction passage that communicates with a workpiece suction recess formed in the table. Compressed gas is supplied into a radial bearing gap formed between the spindle and the bearing sleeve, and exhausted into the outer environment through the gas exhaust space and the passage. Even if part of the compressed gas flow into the space between the chucking sleeve and the spindle, it can be instantly sucked into the suction passage. Thus, compressed gas will never flow into the space over housing.

1 Claim, 2 Drawing Sheets

STATIC PRESSURE GAS BEARING SPINDLE ASSEMBLY

BACKGROUND OF THE INVENTION

This invention relates to a static pressure gas bearing spindle assembly for use in the inspection of optical and magnetic disks.

A conventional static pressure gas bearing spindle assembly is shown in FIG. 2. It includes a housing 30 having a sleeve mounting hole 31 in which two bearing sleeves 32 and 33 are mounted one over the other. A chuck sleeve 34 is mounted between the bearing sleeves 32 and 33. A spindle 35 is inserted through the sleeves 32, 33 and 34. Between the spindle 35 and the respective sleeves 32 and 33 are provided radial bearing gaps 36. The bearing sleeves 32, 33 have nozzles 37 through which compressed gas is jetted into the radial gaps 36.

The spindle 35 carries at its top end a table 38 and at its bottom end a thrust plate 39 that opposes a flange 33a provided at the bottom end of the lower bearing sleeve 33. A bearing plate 40 is provided opposite to the bottom surface of the thrust plate 39. The bearing plate 40 and the flange 33a of the bearing sleeve 33 have nozzles 42 through which compressed gas is jetted into thrust bearing gaps 41 formed between the thrust plate 39 and the bearing plate 40 and between the thrust plate 39 and the flange 33a, respectively.

The chuck sleeve 34 is formed with a suction passage 43 that communicates with a disk suction recess 38a formed in the table 38.

In operation, a workpiece such as an optical disk or a magnetic disk is sucked to the table 38. Then, compressed gas is jetted through the nozzles 37 and 42 in to the radial bearing gaps 36 and the thrust bearing gaps 41 so that the spindle 35 is supported by a film of gas formed in the gaps 36, 41. In this state, the spindle 35 is rotated at a high speed to inspect the workpiece carried on the table.

Such a conventional static pressure gas bearing spindle assembly has annular gas exhaust spaces 44 between the chuck sleeve 34 and the two bearing sleeves 32, 33. Also, the housing 30 has a gas exhaust passage 45 that communicates with the gas exhaust spaces 44. Compressed gas supplied into the radial bearing gaps 36 and the thrust bearing gaps 41 is thus exhausted through the gas exhaust passage 45.

The radial bearing gap 36 formed between the upper bearing sleeve 32 and the spindle 35 communicates with the space between the bottom surface of the table 38 and the top surface of the housing 30. Thus, compressed gas supplied into the radial bearing gaps 36 tends to flow upwards and leak out through the space between the table 38 and the housing 30. In order to prevent such gas leakage, a cover 46 is provided on the top surface of the housing 30. But such a cover cannot completely prevent the leakage of gas.

If the compressed gas supplied into the bearing gaps contain dust, such dust may adhere to the workpiece carried on the table 38 and thus make inspection of the workpiece inaccurate.

An object of this invention is to provide a static pressure gas bearing spindle assembly which can prevent the leakage of compressed gas supplied into the bearing gap and thus can prevent any dust contained in the compressed gas from adhering to the workpiece supported on the table, such as a disk.

SUMMARY OF THE INVENTION

In order to attain this object, according to this invention, there is provided a spindle assembly in which the chucking sleeve is disposed at the top end of the sleeve mounting hole, which the bearing sleeve is provided under the chucking sleeve with an annular gas exhaust space defined between the chucking sleeve and the bearing sleeve, and which the housing is formed with a gas exhaust passage that communicates with the gas exhaust space.

Since the chucking sleeve is provided at the top end of the sleeve mounting hole and the gas exhaust passage communicates with the annular gas exhaust space provided under the chucking sleeve, the compressed gas supplied into the bearing gap between the bearing sleeve and the spindle is exhausted to the outside through the gas exhaust space and the gas exhaust passage. It will scarcely flow into the gap between the chucking sleeve and the spindle. Should compressed air flow into this gap, it will be sucked up into the suction passage formed in the chucking sleeve, so that it will never flow into the space above the housing.

Thus, any dust contained in the compressed air will never stick to the workpiece supported on the table.

Other features and objects of the present invention will become apparent from the following description made with reference to the accompanying drawings, in which:

DETAILED DESCRIPTION OF THE PREFERRED EMBODIMENT

Figure 1:
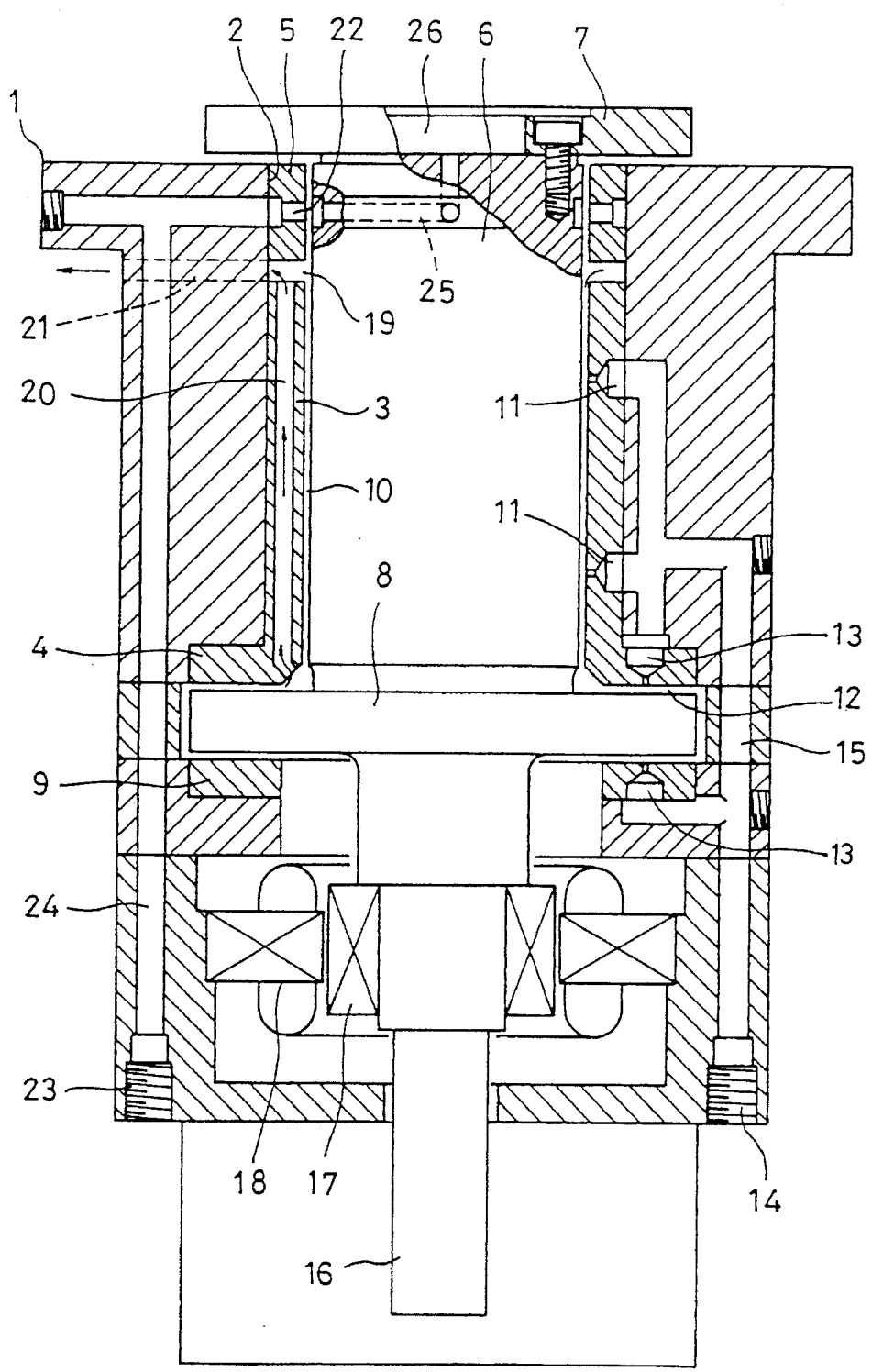
FIG. 1 is a front view in vertical section of one embodiment of the static pressure gas bearing spindle assembly according to this invention.
Figure 2:
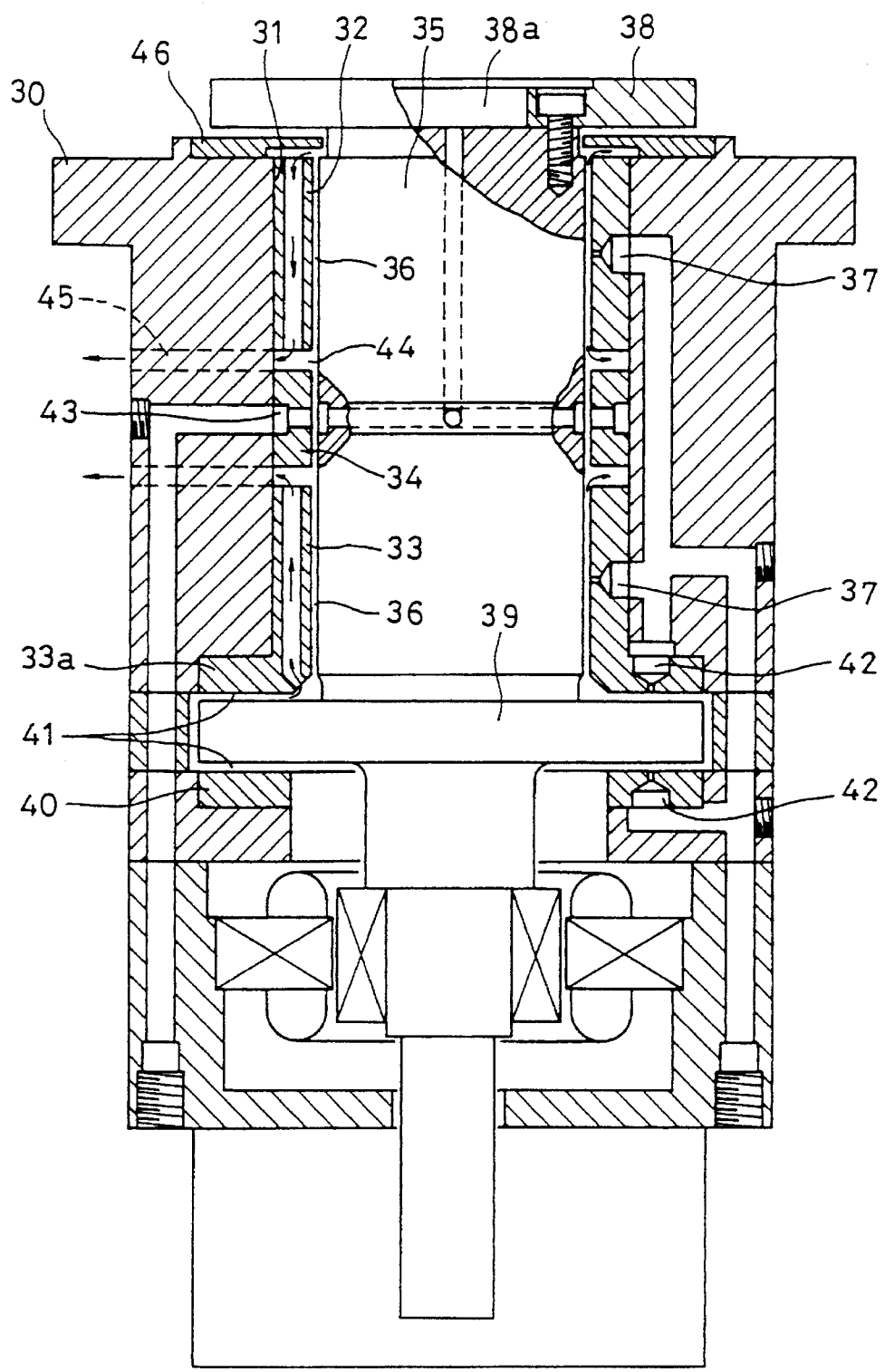
FIG. 2 is a front view in vertical section of a static pressure gas bearing spindle assembly of the prior art.

Now referring to FIG. 1, a bearing sleeve 3 is mounted in a sleeve mounting hole 2 formed in a housing 1. It has a flange 4 at its bottom end.

Also mounted in the sleeve mounting hole 2 is a chucking sleeve 5 over the bearing sleeve 3. A spindle 6 extends through the chucking sleeve 5 and the bearing sleeve 3.

A table 7 is secured to the top end of the spindle 6, which also carries a thrust plate 8 so as to be opposite to the flange 4 of the bearing sleeve 3. Under the thrust plate 8 is an annular bearing plate 9.

The bearing sleeve 3 is provided with nozzles 11 that communicate with a radial bearing gap 10 formed between the bearing sleeve 3 and the spindle 6. Similarly, the flange 4 of the bearing sleeve 3 and the bearing plate 9 are formed with nozzles 13 that communicate with thrust bearing gaps 12 formed between the thrust plate 8 and the flange 4 and between the thrust plate 8 and the bearing plate 9, respectively. These nozzles 11 and 13 communicate with a gas supply port 14 through a gas supply passage 15.

A small-diameter shaft 16 extends downwards from the bottom surface of the thrust plate 8. It carries a motor rotor 17 of a motor. Its motor stator 18 is mounted on the housing 1. The spindle 6 is rotated by activating the motor stator 18.

But the spindle 6 may be rotated by any other means, such as by blowing compressed gas against turbine blades mounted on the small-diameter shaft 16 through nozzles provided around the blades.

An annular gas exhaust space 19 is defined between the bottom surface of the chucking sleeve 5 and the top surface of the bearing sleeve 3. The space 19 communicates with the thrust bearing gaps 12 through an axial passage 20 formed in the bearing sleeve 3. Also, it communicates with the exterior through a gas exhaust passage 21 formed in the housing 1.

The chucking sleeve 5 has a suction passage 22 consisting of an annular groove and a plurality of radial holes formed in the bottom of the annular groove. The suction passage 22 communicates with a suction port 23 at the bottom end of the housing 1 through a passage 24. The suction passage 22 also communicates with a workpiece suction recess 26 formed in the table 7 through a passage 25 formed in the spindle 6.

In operation, a suction force is applied to the suction port 23 and to the suction recess 26 of the table 7 through the suction passage 22 in the chucking sleeve 5 and the passage 25 in the spindle 6 to suck a workpiece placed on the table 7, such as an optical disk or a magnetic disk.

Also, compressed gas is supplied into the gas supply port 14 and jetted through the respective nozzles 11 and 13 into the radial bearing gaps 10 and thrust bearing gaps 12 to support the spindle 6 on a film of compressed gas in the bearing gaps 10 and 12. In this state, the spindle 6 is rotated at a high speed to inspect the workpiece.

During such inspection, part of the compressed gas jetted through the nozzles 11 into between the bearing sleeve 3 and the spindle 6 will flow upwards while the remaining part will flow downwards. The compressed gas that flows upwards flows into the gas exhaust space 19, while the compressed gas that flows downwards and the compressed gas jetted from the nozzles 11, 13 into the thrust bearing gaps 12 flow into the gas exhaust space 19 through the passage 20. The compressed gas that has flown into the space 19 is then directed into the gas exhaust passage 21 and exhausted. No compressed gas will flow into the space between the chucking sleeve 5 and the spindle 6.

Should compressed gas flow into this space, it will be instantly sucked into the suction passage 22 of the chucking sleeve 5 because a suction force is always applied to the suction passage 22. Thus, compressed gas cannot leak into the area above the housing 1, so that there is no possibility that any dust contained in the gas may adhere to the surface of the workpiece supported on the table 7. Thus, it is possible to inspect the workpiece with high accuracy.

What is claimed is:

1. A static pressure gas bearing spindle assembly comprising a housing having a top-open sleeve mounting hole, a bearing sleeve and a chucking sleeve mounted in said sleeve mounting hole, a spindle inserted through said bearing sleeve and said chucking sleeve, a table secured to a top end of said spindle, a thrust plate secured to a bottom end of said spindle, a bearing plate provided under and opposite to said thrust plate, said bearing sleeve having a flange at bottom end thereof, said flange and said bearing plate having nozzles through which compressed gas is jetted into thrust bearing gaps formed between said thrust plate and said flange and between said thrust plate and said bearing plate, said bearing sleeve being formed with a nozzle through which compressed gas is jetted into a radial bearing gap formed between said spindle and said bearing sleeve, said chucking sleeve being formed with a suction passage which communicates with a workpiece suction recess formed in said table, characterized in that said chucking sleeve is disposed in said sleeve mounting hole at top thereof, that said bearing sleeve is provided under said chucking sleeve with an annular gas exhaust space defined between said chucking sleeve and said bearing sleeve, and that said housing is formed with a gas exhaust passage that communicates with said gas exhaust space.

* * * * *